United States Patent [19]

Schuneman et al.

[11] Patent Number: 5,862,253
[45] Date of Patent: Jan. 19, 1999

[54] COLOR IMAGING SYSTEM AND PROCESS WITH HIGH-SPEED RENDERING

[75] Inventors: Thomas A. Schuneman, Arlington, Mass.; David John Earl, Fulbourn; William Craig Revie, Over, both of England; Andrew Masia, Newburyport, Mass.

[73] Assignee: Harlequin Group plc, Cambridge, England

[21] Appl. No.: 643,186

[22] Filed: May 3, 1996

[51] Int. Cl.[6] .................................................. G06K 9/00
[52] U.S. Cl. ......................... 382/162; 358/518; 358/525
[58] Field of Search ................................... 358/518, 520, 358/523, 524, 525, 224; 382/302, 162, 300; 364/723, 577, 853; 345/154, 186; 395/131, 514

[56] References Cited

U.S. PATENT DOCUMENTS

| | | | |
|---|---|---|---|
| 4,275,413 | 6/1981 | Sakamoto et al. | 358/525 |
| 4,511,989 | 4/1985 | Sakamoto | 364/723 |
| 4,992,861 | 2/1991 | D'Errico | 358/500 |
| 5,162,925 | 11/1992 | Takaoka et al. | 358/447 |
| 5,208,911 | 5/1993 | Newman et al. | 395/514 |
| 5,311,322 | 5/1994 | Imao et al. | 358/518 |
| 5,321,797 | 6/1994 | Morton | 395/131 |
| 5,377,041 | 12/1994 | Spaulding et al. | 358/518 |
| 5,432,906 | 7/1995 | Newman et al. | 382/302 |

FOREIGN PATENT DOCUMENTS 0 273 398 A2  12/1987  European Pat. Off. ......... H04N 1/46
0 497 466 A1  1/1992   European Pat. Off. ......... H04N 1/46

OTHER PUBLICATIONS

Dennis Brag, 1.4 *A Simple Color Reduction Filter*, Graphics Gems III, Copyright©1992 by American Press, Inc.

Digita Image Processing, George A. Baxes "Truncation Coding" 1994.

"Color Quantization of Images, "Michael T. Orchard IEEE Transactions on Signal Processing, vol. 39, No. 12 Dec. 1991.

*Primary Examiner*—Amelia Au
*Assistant Examiner*—Samir Ahmed
*Attorney, Agent, or Firm*—Fliesler Dubb Meyer & Lovejoy, LLP

[57] ABSTRACT

A system for processing images includes an image file subsystem providing a source signal representing an input image; a color transformation subsystem coupled to the image file subsystem and accepting as input the source signal and producing a target signal therefrom, and an image forming subsystem coupled to the color transformation subsystem and forming a physical manifestation of the input image in response to the target signal, the color transformation subsystem being configured to establish a memory "cube" area representative of possible source signals, to define a sub-cube portion of the memory area as representative of the source signal; to determine possible target signals corresponding to the sub-cube portion; and to determine the target signal responsive to the possible target signals. If interpolation is found to be accurate for a mini-cube portion of the sub-cube, truncation or interpolation are used to derive the target signal; otherwise, the target signal is determined directly.

2 Claims, 5 Drawing Sheets

COLOR IMAGING SYSTEM AND PROCESS WITH HIGH-SPEED RENDERING

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND OF THE INVENTION

This invention relates generally to image-forming systems and processes, and specifically to systems and processes involving the transformation of color image signals from one form into another.

Modern imaging systems used in the pre-press, printing, computer graphics, and related industries make extensive use of color image information. This information is sometimes derived from scanning photographs and other "hard-copy" images, and is in other instances obtained directly from a computer-generated graphics file.

Various sources of color images produce digital data files in which color is specified in various ways. Furthermore, different types of output devices, for instance computer monitors, color ink-jet and laser printers, and imagesetters, are designed to operate using various different standards for defining colors.

One common component of an image-forming system is a page description language interpreter, for instance as produced by Adobe Systems Incorporated for interpretation of the PostScript® page description language. One function of apparatus employing such interpreters is to accept, as input, signals corresponding to imaging commands written in a page description language and to produce, as output, signals recognizable by an imaging engine, such as a laser print engine of a conventional color laser printer. Further pertinent background is presented in the POSTSCRIPT LANGUAGE REFERENCE MANUAL, SECOND EDITION, Adobe Systems Inc., pp. 176–192, 295–302 (Addison-Wesley 1990), the contents of which are reference.

In performing the transformation from input to output in such apparatus, it is often necessary to convert signals representing a color from one format to another format. Such formats are sometimes referred to as color spaces. For example, a color produced by a computer graphics workstation may initially be specified as separate Red, Green, and Blue values in an "RGB" color space. For printing of a corresponding image, it may be necessary to transform a color signal from the RGB color space to, for example, the "CMYK" color space for printing using Cyan, Magenta, Yellow, and Black (or "Key") colorants. Intermediate color signal transformations also are often called for in order to provide certain benefits, such as the ability to work with a number of different image source devices and image forming devices.

Two general approaches are conventionally used for such color space transformation. In one approach, a mathematical relationship between the input color space and the output color space is determined, and a computer program is implemented to compute output color space signal values from any given set of input color space signal values.

A second approach is to use a conventional "look-up table" stored in computer memory that, for particular values of input color space signals, provides corresponding values of output color space signals. In some instances, more possible inputs exist than would be practical to provide as look-up table inputs. "Sparse" look-up tables, with interpolation for in-between values, are typically used in such cases.

The processing required to perform such color space transformations using conventional techniques is computationally intensive and requires a relatively large amount of computer memory, which in turn requires the use of more expensive equipment to perform such processing.

It would be desirable for an image processing system to process color transformations in a manner that is more efficient than possible with the known techniques. No known solution adequately addresses the need for a simple, flexible, inexpensive system and process for color transformations.

SUMMARY OF THE INVENTION

In accordance with the present invention, a system (100) for processing images includes an image file subsystem (201) providing a source signal representing an input image; a color transformation subsystem (202) operatively coupled to the image file subsystem and accepting as input the source signal and producing a target signal therefrom, and an image forming subsystem (203) operatively coupled to the color transformation subsystem and forming a physical manifestation of the input image in response to the target signal, the color transformation subsystem being configured to establish a memory "cube" area representative of possible source signals, to define a sub-cube portion of the memory area as representative of said source signal; to determine possible target signals corresponding to the sub-cube portion; and to determine the target signal in response to the possible target signals.

Also in accordance with the present invention, the color transformation subsystem is further configured to divide the sub-cube portion into mini-cube portions and to determine possible target signals corresponding to each mini-cube portion.

Further in accordance with the present invention, the color transformation subsystem is configured to determine an accuracy of interpolation for each of the mini-cubes.

Still further in accordance with the present invention, the color transformation subsystem is configured to determine the target signal in a first manner if an accuracy of interpolation exceeds a predetermined threshold and to determine the target signal in a second manner if the accuracy of interpolation does not exceed a predetermined threshold. The first manner may include truncation or interpolation.

Yet further in accordance with the present invention, the color transformation subsystem is configured to add a noise signal to the source signal and truncate the resulting signal.

In another aspect of the invention, a method of processing a color image source signal to produce a target signal includes establishing a memory area representative of possible source signals; defining a sub-cube portion of the memory area as representative of a source signal; determining possible target signals corresponding to the sub-cube portion; and determining the target signal in response to the possible target signals.

Also in accordance with this aspect of the present invention, the method further includes dividing the sub-cube portion into mini-cube portions and determining possible target signals corresponding to each mini-cube portion.

Further in accordance with this aspect of the present invention, method includes determining an accuracy of interpolation for each of the mini-cubes.

Still further in accordance with this aspect of the present invention, the method includes determining the target signal in a first manner if an accuracy of interpolation exceeds a predetermined threshold and determining the target signal in a second manner if an accuracy of interpolation does not exceed a predetermined threshold. The first manner may include truncation or interpolation.

Yet further in accordance with this aspect of the present invention, the method includes adding a noise signal to the source signal and truncating the resulting signal.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE DRAWINGS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
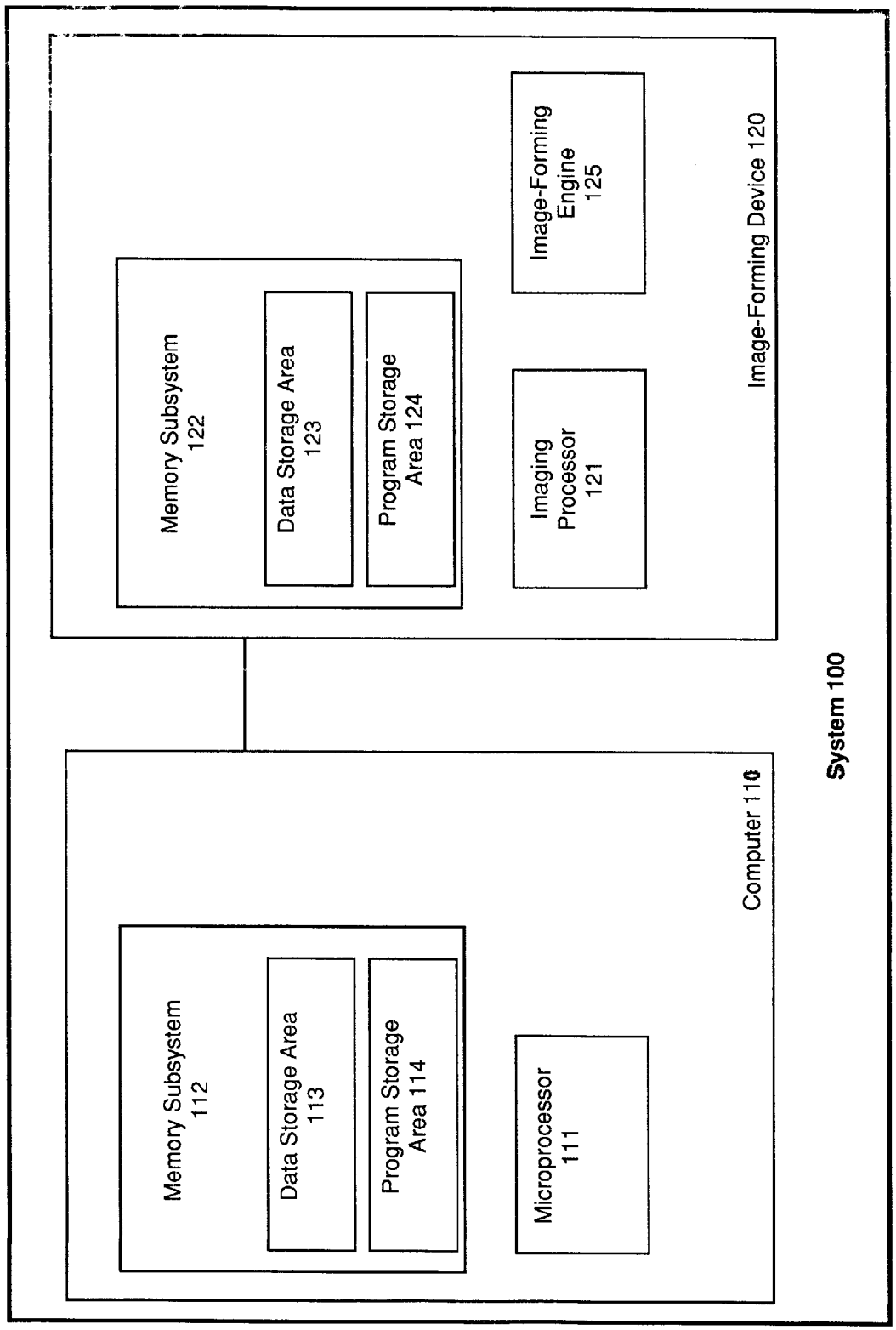
FIG. 1 is a block diagram of an image processing system in accordance with the present invention.

Referring now to FIG. 1, there is shown an image processing system 100 in accordance with the present invention. The major components of system 100 include a computer 110 and an image forming device 120. Computer 110 includes a microprocessor 111 and a memory subsystem 112, including a data storage area 113 and a program storage area 114. Image-forming device 120 includes an imaging processor 121, a memory system 122 having a data storage area 123 and a program storage area 124, and an image forming engine 125.

In a preferred embodiment, computer 110 and image-forming device 120 are implemented by conventional hardware, programmed for operation as described herein. Specifically, one preferred embodiment implements computer 110 by a model 8100/110 computer produced by Apple Computer and implements image-forming device 120 by a model 835 RSH color printer produced by Seiko Instruments Inc.

Memory subsystem 112 is implemented conventionally through random-access memory and disk memory devices integrated with computer 110. As indicated in FIG. 1, a portion of such memory is used for data storage (113) and a portion is used for program storage (114). Similarly, the memory subsystem 122 of image-forming device 120 is implemented conventionally using random access memory and disk storage devices.

The imaging processor 121 and image-forming engine 120 of image-forming device 120 are also conventional devices. Using the example of the Seiko Instruments model 835 RSH color printer, imaging processor 121 is implemented using a model 68340 microprocessor produced by Motorola Inc., and image-forming engine 125 is implemented using a model 835 thermal-wax transfer/dye sublimation print engine produced by Seiko Instruments Inc.

Figure 2:
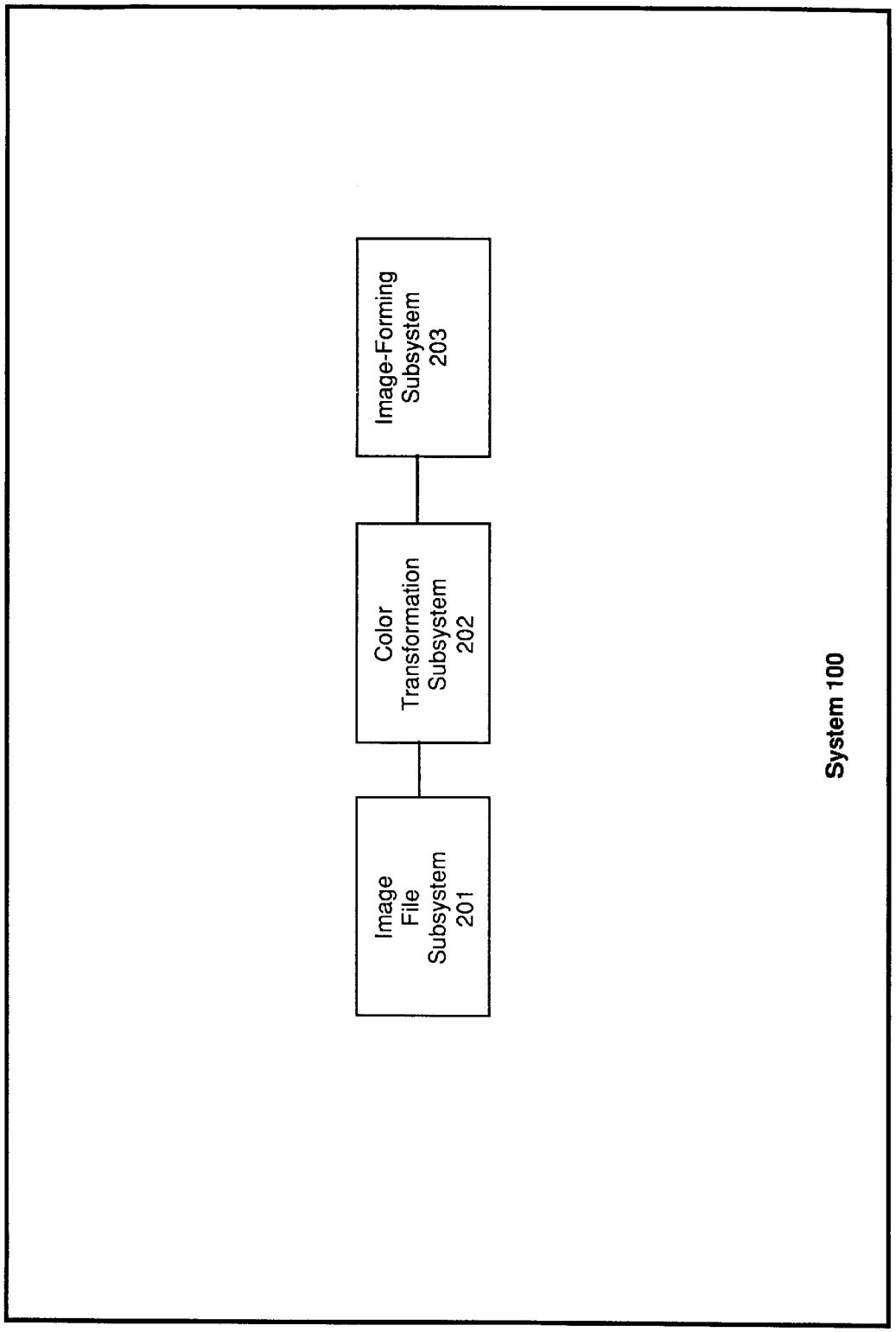
FIG. 2 is a functional block diagram of the system illustrated in FIG. 1.

Referring now to FIG. 2, there is illustrated a functional block diagram of system 100. Functionally, system 100 includes three major pertinent subsystems: an image file subsystem 201, a color transformation subsystem 202, and an image-forming subsystem 203. Image file subsystem 201 provides signals representative of an input image, for example digital signals corresponding to PostScript language commands for drawing a color image, with the colors described in the RGB color space.

Color transformation subsystem 202 converts the signals from image file subsystem 201 into a form that can be used by image-forming subsystem 203 to produce an image. To illustrate, if image-forming subsystem 203 is expecting raster imaging signals for printing using a conventional four color separation (CMYK) mechanism, then color transformation subsystem 202 transforms the RGB signals from image file subsystem 201 into CMYK signals usable by image-forming subsystem 203.

Because both computer 110 and image-forming device 120 include programmable, general-purpose microprocessors (111, 121, respectively), many of the functions of subsystems 201–203 may be performed either by computer 110 or by image-forming device 120. In a preferred embodiment, image file subsystem 201 is implemented by computer 110, color transformation subsystem 202 is implemented by computer 110, and image-forming subsystem is implemented by image-forming device 120.

Figure 3:
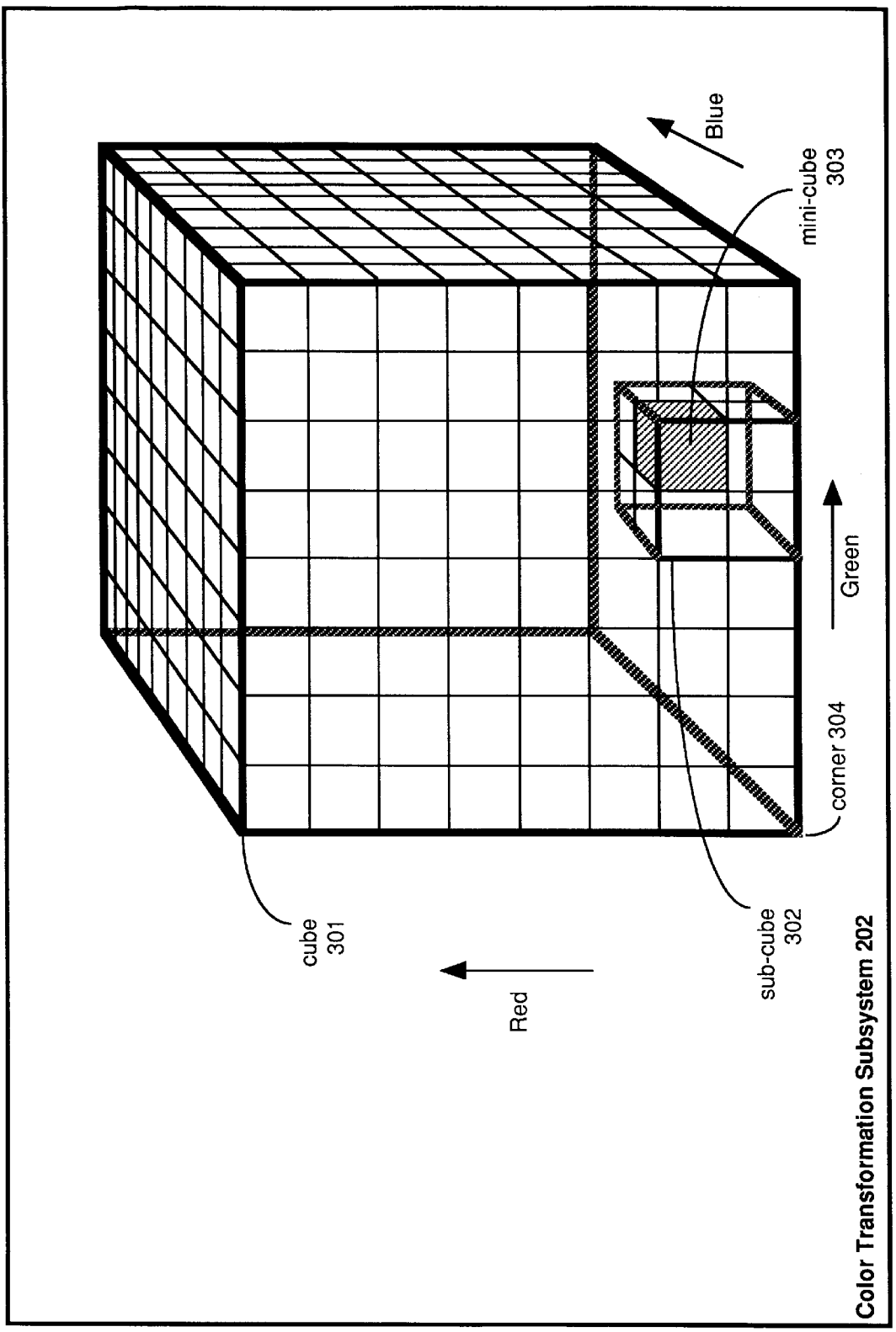
FIG. 3 is an illustration of a memory structure known as a "cube," implemented by the color transformation subsystem illustrated in FIG. 2.

Referring now to FIG. 3, there is illustrated an exemplary memory structure 301 known as a "cube" that is implemented by color transformation subsystem 202. Cube 301 is illustrated in FIG. 3 in simplified form for purposes of explanation, as will be evident by the description herein. In a preferred embodiment, cube 301 is a portion of data storage area 113 in computer 110 and is organized as a multi-dimensional table. For some combinations of possible values of red, green, and blue signals there is a corresponding location (or address) of cube 301, as detailed below.

For illustrative purposes, the lower-left hand corner 304 of the front of cube 301 may be considered an origin point corresponding to red, green, and blue signals having corresponding values 0, 0, and 0. If each grid line shown on cube 301 represents an increment of one for the corresponding red, green, and blue signals, then cube 301 can address red, green, and blue values ranging from (0,0,0) to (8,8,8). Thus, the lower-left hand corner of the front of the element labeled mini-cube 303 corresponds to an RGB signal of (1,5,0).

Each location where grid lines intersect, such as (1,5,0), represents the location of a memory cell in data storage area 123. As discussed in greater detail below, the contents of that memory cell contains information pertinent to the desired transformation of color information from the RGB color space to a different color space used by system 100. For instance, if cube 301 were to be intended for transformation from RGB to CMYK, then the memory cell addressed by (1,5,0) might contain the values (95, 22, 128, 0), which might be the description of the same color in CMYK color space as is represented by (1,5,0) in RGB color space.

To reduce memory requirements cube 301 does not include grid intersections for every possible value of R, G and B. To illustrate, an input image might include a color represented by an RGB signal of (1.2, 5.6, 0.3). Furthermore, to reduce computational requirements, systems 100 does not initialize operations by pre-determining the corresponding CMYK values that should be stored in each memory cell of cube 301. Rather, the processing described in connection with FIGS. 3 and 4 permits all necessary transformations to be made without fully populating cube 301 with transformation entries, and without the need for an intractable number of grid lines.

It should be noted that cube 301 of FIG. 3 is simplified in two ways. First, in a typical operating environment for system 100, transformations are from input signals describing color in input color spaces that may be defined in more than three dimensions, rather than the three dimensions of the RGB color space, to output color spaces that may range from one dimension (e.g., black and white) to more than four dimensions (for so-called "high fidelity" printing systems that use more than four inks). RGB is used as an example input color space simply because a three dimensional cube is easier to illustrate for instructional purposes than a cube having four or more dimensions (i.e., a "hypercube"). It should be recognized that use herein of the term "cube" refers, for convenience, to a multi-dimensional memory structure that may or may not be three-dimensional. Second, the use of only eight grid lines each for R, G, and B is more coarse than is implemented in a preferred embodiment; in a preferred embodiment 32 grid points are provided in each of the n input dimensions of the cube. It should also be recognized that in alternate embodiments, additional information, such as screening parameters, could be addressed and stored using cube 301.

In general, transformations among the color spaces supported by system 100 are not linear transformations, but are complex relationships. Accordingly, computing an output color space signal value from a set of input color space signal values is often a computationally intensive task. Therefore, to minimize the processing overhead imposed by such transformation, system 100 attempts to minimize the number of such transformational computations that must be made.

One conventional step in minimizing the number of computations is through the use of a multi-dimensional look-up table such as cube 301. Known systems determine output signals for each input signal value represented by each intersection of grid lines of cube 301. If an input signal does not fall precisely on a grid line intersection, conventional interpolation techniques are used to determine an output signal.

Figure 4:
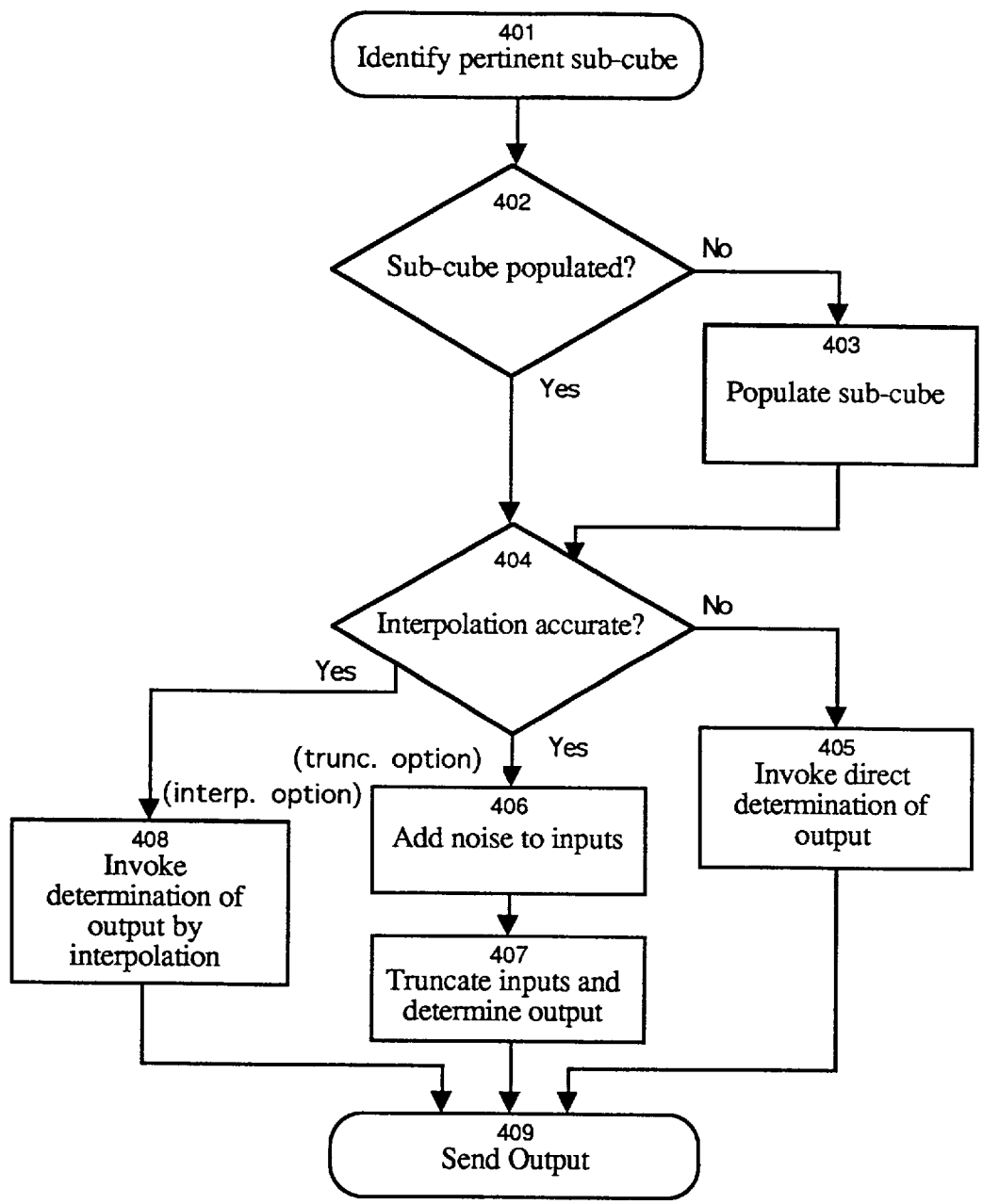
FIG. 4 is a flow chart of processing in accordance with the present invention.

Referring now also to FIG. 4, system 100 improves upon the conventional techniques in a number of ways. First, system 100 does not commence by determining output signals corresponding to each grid line intersection of cube 301, but only determines output signals for some relevant subset of intersections. Second, system 100 approximates interpolation by the introduction of a randomization function and a truncation function.

Specifically, cube 301 is divided into a number of sub-cubes, e.g., 302. Each sub-cube, in turn, is defined as including a number of mini-cubes, e.g., 303. In a preferred embodiment, each mini-cube has a length equal to a distance between adjacent grid-lines in each dimension. When an input signal is applied to color transformation subsystem 202 for transformation into another color space, processing is performed as illustrated in FIG. 4.

Processing commences by identifying 401 the sub-cube with which the input signal corresponds. Using the example discussed above, the RGB input signal (1.2, 5.6, 0.3) would correspond with (i.e., be "inside") sub-cube 301. Next, a check 402 is made to determine whether any space has yet been reserved for sub-cube 301 in data storage area 123 and whether the memory cells for each grid point of the sub-cube already contain output signal data. If so, the sub-cube is considered to be "populated" and processing continues. If not, the sub-cube is populated 403, as detailed in connection with FIG. 5, before processing continues.

Next, the mini-cube, e.g., 303, corresponding to the input signal, e.g., (1.2, 5.6, 0.3), is checked 404 to determine whether interpolation will be sufficiently accurate for that mini-cube. In a preferred embodiment, this check is made by looking up a stored Boolean value indicating the validity of interpolation for this mini-cube. These Boolean values are determined as set forth in connection with FIG. 5. If determination 404 indicates that interpolation for the current mini-cube is not accurate, conventional direct determination of the output (e.g., by computation) is invoked 405.

If determination 404 indicates that interpolation is accurate, one of two processing routes is taken. If the user of system 100 has pre-selected an option to determine output by truncation, a pseudo-random noise component is added 406 to the input signal, the input signal is then truncated 407 so as to fall directly on one of the grid line intersections, and the output signal is read from the memory cell corresponding to that grid line intersection. As the addition of the noise component and truncation are computationally trivial compared with either interpolation or direct computation, such pseudo-random selection of a mini-cube corner for an input within a mini-cube is found to provide extremely fast transformation. In practice, it is found that visually pleasing results are obtained using such noise addition and truncation when the interpolation accuracy is found to be within the predetermined threshold. In a preferred embodiment, the amplitude of the added noise is set to be at least equal to the increment value represented by the grid line spacing. A preferred embodiment uses pseudo-random noise that has a uniform probability density function, with all samples equally likely, to approximate a "linear" interpolator. It should be noted that using a different distribution of the noise to allow weighting in favor of particular grid intersections may be desirable in certain applications and alternate embodiments to, for example, more closely approximate a function that is not linear.

As noted above, a preferred embodiment uses pseudo-random noise and truncation to approximate conventional interpolation techniques. By controlling the probability distribution of the random numbers added to the signal prior to truncation, many different forms of interpolation may be approximated at greatly reduced computational complexity. In a preferred embodiment pseudo-random noise is used that has a uniform probability density function. This distribution gives an approximation to linear interpolation. In an alternate embodiment, higher order interpolants, which take into account not only the present mini-cube but adjacent mini-cubes as well, are approximated by selecting random numbers from more than one probability density function and adding the results prior to truncation. Further modifications to the probability distributions could be used to produce other effects such as global color modifications. Modifications to the correlation of the noise could be used to modify the appearance or reproduction characteristics of the resulting image. In a preferred embodiment noise with a very narrow auto-correlation function is used to minimize "graininess" in the resulting image.

If the user of system 100 has pre-selected an option to determine output by interpolation, conventional interpolation 408 is applied to determine the output. In practice, it is found that the truncation option (407) provides faster processing with satisfactory results, but some users in some applications may prefer to use interpolation, and users are thus provided with this option.

Processing is completed by sending 409 the output signal determined by direct computation (405), truncation (407), or interpolation (408) for further processing by color transformation subsystem 202 or by image forming subsystem 203, as may be applicable in any particular situation.

Figure 5:
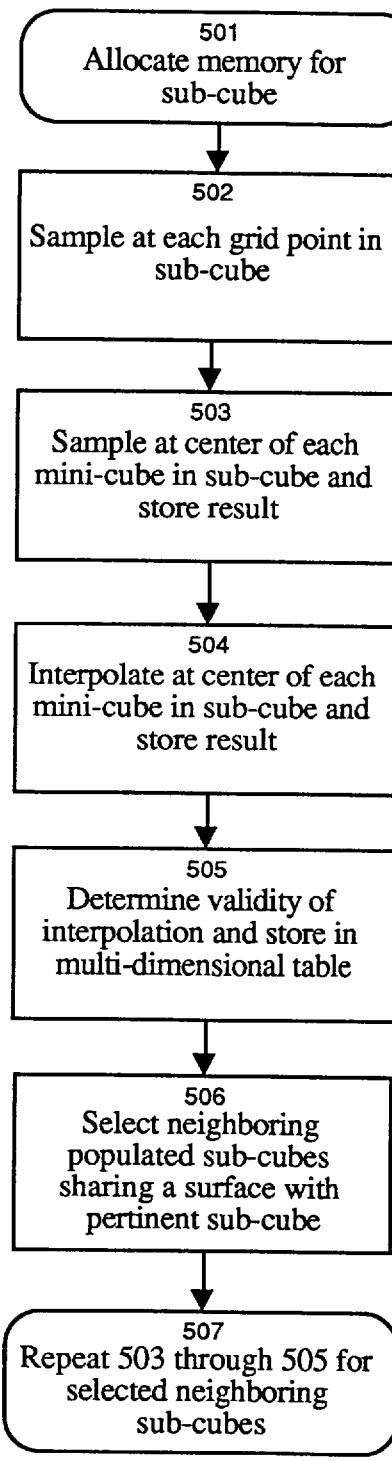
FIG. 5 is a flow chart detailing a portion of the processing illustrated in FIG. 4.

Referring now to FIG. 5, there is shown greater detail concerning processing 403 for populating a sub-cube. Such processing commences by allocating 501 memory space in data storage area 113 for the sub-cube. An output signal corresponding to the input signals for each grid point in the sub-cube is then determined 502, also known as "sampling".

Next, an output signal corresponding to the input signal for the center of each mini-cube is sampled 503, and the results are stored in a temporary memory portion of data storage area 113.

An estimated output signal for the "center" of each mini-cube is then determined 504 by interpolation and the results are stored in a temporary memory portion of data storage area 113. In a preferred embodiment, linear interpolation from all corners of the pertinent mini-cube is used, but it will be evident to those skilled in the art that other methods of interpolation, using different combinations of corners, could be used. For example, in one alternative embodiment, the output signals for all eight corners could initially be considered, the high and low corners discarded, and the output signals for the remaining 6 corners could be averaged to yield the interpolated value. Various additional known interpolation techniques could be used, for instance those disclosed in William H. Press, et al., NUMERICAL RECIPES IN C (Cambridge University Press 1992).

The validity of interpolation for each mini-cube is then determined 505 by comparing the interpolated estimate for the center of that mini-cube and the actual value for the center of that mini-cube to see how close they are. In a preferred embodiment, if the interpolated estimate is within 1.0% of the actual value, interpolation is considered accurate for that mini-cube and a Boolean value representing that fact is stored in data storage area 113. Otherwise, a Boolean value representing that the mini-cube is not amenable to interpolation is stored. In a preferred embodiment, a separate multi-dimensional table is used to store the Boolean values indicating whether interpolation is accurate for each mini-cube, but those skilled in the art will recognize that the Boolean values could alternatively be stored directly in the data structure represented by cube 301. Once a mini-cube has been checked for interpolation accuracy when the corresponding sub-cube is first populated, and the corresponding Boolean value has been stored, accuracy computations need not be performed again for that mini-cube, and the determination 404 of interpolation accuracy is made simply by examining the Boolean value that has been stored for that mini-cube.

Processing continues by selecting 506 any additional mini-cubes adjacent to the current sub-cube that are needed for interpolation, and by repeating processing 503 - 505 for such mini-cubes. Depending on the particular implementation of system 100, mini-cube edges at the edge of a sub-cube may be considered part of that sub-cube or part of an adjacent sub-cube, so the additional processing 506 may be required to completely populate the current sub-cube and determine interpolation validity for each of the minicubes thereof.

As color transformation subsystem 202 continues operation on further input signals, other sub-cubes may be populated as required by the input signals. In a preferred embodiment, should memory subsystem not contain sufficient room for population of additional sub-cubes, the space allocated for sub-cubes that were previously needed is released for re-use. The determination of which sub-cubes to release is based both on recency of use and on whether the current input signal is close to the sub-cube (indicating that subsequent input signals may again be within the sub-cube) or not. Thus, the available space in memory subsystem 112 is cached so that the sub-cubes most likely to be used for future input signals are maintained as populated.

As a further disclosure of a preferred embodiment, exemplary source code of a computer software program, stored for instance on a disk of memory subsystem 112 and for programming of microprocessor 111, is provided as follows:

```
/******************************************************************
 *
 * Name: init_jitter_table
 *
 * Description:
 *
 *      This function initializes the tables used to generate
 *      pseudo-random numbers for use in truncating image data.  This
 *      function must be called prior to any calls to truncate_line().
 *
 * Arguments:
 *
 *      t       - Color table whose jitter table and associated
 *                parameters is to be initialized.
 *
 * Return:
 *
 *      non-zero indicates error.  Likely error is inability to
 *      allocate memory for the jitter-table.
 */

STATIC void init_jitter_table(colorTablePtr t)
{
   int32          i;
   USERVALUE      error, erval;
   USERVALUE      noise;

if (jitterTablesInitted)
   {
      t.tn->uranx = uranx;
      t.tn->irand = irand;
      return;
   } error = ERRNOISEOFFSET;
   noise = NOISELEVEL;

/* initialize look-up tables */
   for (i = 0; i < JITTER_TABLE_SIZE; ++i)
   {
      erval = error * ((jitter_rand() *
                   ((USERVALUE)1.0 + (USERVALUE)2.0 * noise)) - noise) ;
      uranx[i] = (int32)UVAL_RINT(erval);
   }
```

```
        for (i = 0; i < JITTER_TABLE_SIZE; ++i) {
            USERVALUE rnd = (USERVALUE)JITTER_TABLE_SIZE * jitter_rand();
            irand[i] = (int32)UVAL_RINT(rnd) ;
        } t.tn->uranx = uranx;
        t.tn->irand = irand;
        jitterTablesInitted = 1;
    }
    /***********************************************************************
     *
     * Name: truncate_line()
     *
     * Description:
     *
     *      This function performs a similar task to interpolate_color...
     *      except that it performs it via the addition of noise, and
     *      truncation to the nearest grid points in the table.  Over a
     *      large number of samples, this is equivalent to linear
     *      interpolation, but for any given sample, the answer is
     *      only as accurate as the grid spacing of the table.
     *
     * Arguments:
     *
     *      t         - colorTable containing interpolation table, and
     *                  pointers for the jitter table(s).
     *      icolor    - Array of 4-pointers to 16-bit image data values in
     *                  "canonical" form.
     *      ocolor    - Array of 4-pointers to 8-bit image data values
     *                  transformed to the "device" space.
     *      count     - Number of pixels to be transformed.
     *      ispace    - Input color space identifier.
     *      ospace    - Output color space identifier.
     *
     * Return:
     *
     *      non-zero indicates error.  Likely error is inability to populate
     *      a region for truncation.
     */ int32 truncate_line(uint16 *icolor[4], uint16 *ocolor[4], uint32 count,
                uint8 ispace, uint8 ospace, uint8 xfer_applied)
    {
        int32         ypos;
        int32         *rindex;
```

```
        int32               *rval;
        colorTablePtr       t;
        fourColorCubePtr    mini_cube;
        fourColor   corner;
5       int32               index[4];
        int32               ncolors;
        int32               result;
        SYSTEMVALUE         *range;
        transferLut         *lut;
10      int32               ndims ;

if (count == 0)
          return(TRUE);

15      t = get_current_table(ispace);
        HQASSERT(t.tn != NULL,"Null table returned from get_current_table");

ndims = t.tn->ndims ;
        HQASSERT( ndims == 3 | | ndims == 4, "Invalid input dimensionality");
20
        lut = get_current_transfer_lut();
        switch((int32)ispace)
          {
          case SPACE_CIEBasedA:
25          HQFAIL("Multi-dimensional caching invalid for one-dimension");
            range = NULL;
            break;
          case SPACE_CIEBasedABC:
            range = thegsCIERangeABC(gstate);
30          break;
          case SPACE_CIETable3:
          case SPACE_CIETable4:
            range = theIgsCIETableRange(&gstate);
            break;
35        case SPACE_DeviceRGB:
          case SPACE_DeviceCMYK:
          case SPACE_DeviceGray:
            /* If you want to test this code for use with conventional conversions,
             * it does work.  Simply remove the HQFAIL alert.
40           *
             * elf 24-Jul-95
             */
            range = identityRange;
            HQFAIL("Multi-dimensional caching only intended for dev. ind.
45      spaces\n");
            break;
```

```
        default:
            HQFAIL("Unknown or unsupported color-space\n");
            return FALSE ;
        } ncolors = colorspace_dimension[(int32)ospace];

if (t.tn->uranx == NULL)
            init_jitter_table(t);

rindex = t.tn->irand;
        rval = t.tn->uranx;
        ypos = t.tn->ypos;

if ( ndims == 3 )
        {
            register int32 a, b, c ;

index[3] = 0;
            do
                {
                    /* Add noise to each of the components, Clamp the components to
                       range 0->MAX_SCALED_16, then convert to table indices */
                    a = (int32)*icolor[0] + JITTERX(rval, rindex, count, ypos, 0);
                    a = CLIP_TO_RANGE(a, 0, MAX_SCALED_16);
                    a >>= TRUNCATE_SHIFT ;
                    index[0] = a ;

b = (int32)*icolor[1] + JITTERX(rval, rindex, count, ypos, 1);
                    b = CLIP_TO_RANGE(b, 0, MAX_SCALED_16);
                    b >>= TRUNCATE_SHIFT ;
                    index[1] = b ;

c = (int32)*icolor[2] + JITTERX(rval, rindex, count, ypos, 2);
                    c = CLIP_TO_RANGE(c, 0, MAX_SCALED_16);
                    c >>= TRUNCATE_SHIFT ;
                    index[2] = c ;

icolor[0]++, icolor[1]++, icolor[2]++;

cbm_getbit(t.tn->bitTable, ndims, index, &result);
                    if (!result)
                    {
                        if (!populate_bounding_region(t, index, ispace, ospace, FALSE))
                            {
                                USERVALUE itcolor[4];
```

```
            USERVALUE  scratch_color[4];
            uint8      space_p;

itcolor[0] = (USERVALUE)(a / t.tn->factA + range[0]) ;
            itcolor[1] = (USERVALUE)(b / t.tn->factB + range[2]) ;
            itcolor[2] = (USERVALUE)(c / t.tn->factC + range[4]) ;
            itcolor[3] = (USERVALUE)0.0 ;

if (!transform_color(ispace, itcolor, ospace,
                                 scratch_color, &space_p))
              return FALSE ;

corner.a = scratch_color[0];
            corner.b = scratch_color[1];
            corner.c = scratch_color[2];
            corner.d = scratch_color[3];
          }
        else
          {
            mini_cube.c3 = GET_3MINI(t, a, b, c);
            corner = GET_3VALUE(mini_cube, a, b, c);
          }

}
    else
      {
        mini_cube.c3 = GET_3MINI(t, a, b, c);
        corner = GET_3VALUE(mini_cube, a, b, c);
      }

/* Perform the equivalent of transform_color_final */
    if ((int32)ospace == SPACE_notset)
      {
        switch(ncolors)
        {
        case 4:
            *ocolor[3]++ = (uint16)corner.d;
        case 3:
            *ocolor[2]++ = (uint16)corner.c;
            *ocolor[1]++ = (uint16)corner.b;
        case 1:
            *ocolor[0]++ = (uint16)corner.a;
            break;
        default:
            HQFAIL("Invalid number of ouput colors\n");
```

```
            }
          }
        else
          {
            if (!lut->populated)
                populate_transfer_lut(lut, xfer_applied);

switch(ncolors)
              {
              case 4:
                  *ocolor[3]++ = (uint16)(lut->xfer[3]
                                      [(int32)(corner.d*(USERVALUE)255.0)]);
              case 3:
                  *ocolor[2]++ = (uint16)(lut->xfer[2]
                                      [(int32)(corner.c*(USERVALUE)255.0)]);
                  *ocolor[1]++ = (uint16)(lut->xfer[1]
                                      [(int32)(corner.b*(USERVALUE)255.0)]);
              case 1:
                  *ocolor[0]++ = (uint16)(lut->xfer[0]
                                      [(int32)(corner.a*(USERVALUE)255.0)]);
                  break;
              default:
                  HQFAIL("Invalid number of ouput colors\n");
              }
          }
      }while (--count);

}
  else /* 4d case */
    {
      register int32 a, b, c, d ;

do
        {
          /* Add noise to each of the components, Clamp the components to
             range 0->MAX_SCALED_16, then convert to table indices */
          a = (int32)*icolor[0] + JITTERX(rval, rindex, count, ypos, 0);
          a = CLIP_TO_RANGE(a, 0, MAX_SCALED_16);
          a >>= TRUNCATE_SHIFT ;
          index[0] = a ;

b = (int32)*icolor[1] + JITTERX(rval, rindex, count, ypos, 1);
          b = CLIP_TO_RANGE(b, 0, MAX_SCALED_16);
          b >>= TRUNCATE_SHIFT ;
          index[1] = b ;
```

```
        c = (int32)*icolor[2] + JITTERX(rval, rindex, count, ypos, 2);
        c = CLIP_TO_RANGE(c, 0, MAX_SCALED_16);
        c >>= TRUNCATE_SHIFT ;
5       index[2] = c ;

d = (int32)*icolor[3] + JITTERX(rval, rindex, count, ypos, 3);
        d = CLIP_TO_RANGE(d, 0, MAX_SCALED_16);
        d >>= TRUNCATE_SHIFT ;
10      index[3] = d ;

icolor[0]++, icolor[1]++, icolor[2]++, icolor[3]++;

cbm_getbit(t.tn->bitTable, ndims, index, &result);
15      if (!result)
         {
            if (!populate_bounding_region(t, index, ispace, ospace, FALSE))
              {
                USERVALUE itcolor[4];
20              USERVALUE scratch_color[4];
                uint8      space_p;

itcolor[0] = (USERVALUE)(a / t.tn->factA + range[0]) ;
25              itcolor[1] = (USERVALUE)(b / t.tn->factB + range[2]) ;
                itcolor[2] = (USERVALUE)(c / t.tn->factC + range[4]) ;
                itcolor[3] = (USERVALUE)(d / t.tn->factD + range[6]) ;

if (!transform_color(ispace, itcolor, ospace,
30                                   scratch_color, &space_p))
                   return FALSE ;

corner.a = scratch_color[0];
                corner.b = scratch_color[1];
35              corner.c = scratch_color[2];
                corner.d = scratch_color[3];
              }
           else
            {
40            mini_cube.c4 = GET_4MINI(t, a, b, c, d);
              corner = GET_4VALUE(mini_cube, a, b, c, d);
            }

}
45      else
         {
```

```
      mini_cube.c4 = GET_4MINI(t, a, b, c, d);
      corner = GET_4VALUE(mini_cube, a, b, c, d);
    }

/* Perform the equivalent of transform_color_final */
    if ((int32)ospace == SPACE_notset)
    {
      switch(ncolors)
      {
        case 4:
            *ocolor[3]++ = (uint16)corner.d;
        case 3:
            *ocolor[2]++ = (uint16)corner.c;
            *ocolor[1]++ = (uint16)corner.b;
        case 1:
            *ocolor[0]++ = (uint16)corner.a;
            break;
        default:
            HQFAIL("Invalid number of ouput colors\n");
      }
    }
    else
    { if (!lut->populated)
          populate_transfer_lut(lut, xfer_applied);

switch(ncolors)
      {
        case 4:
            *ocolor[3]++ = (uint16)(lut->xfer[3]
                                [(int32)(corner.d*(USERVALUE)255.0)]);
        case 3:
            *ocolor[2]++ = (uint16)(lut->xfer[2]
                                [(int32)(corner.c*(USERVALUE)255.0)]);
            *ocolor[1]++ = (uint16)(lut->xfer[1]
                                [(int32)(corner.b*(USERVALUE)255.0)]);
        case 1:
            *ocolor[0]++ = (uint16)(lut->xfer[0]
                                [(int32)(corner.a*(USERVALUE)255.0)]);
            break;
        default:
            HQFAIL("Invalid number of ouput colors\n");
      }
    }
  }while (--count);
```

```
     }
     t.tn->ypos++;
     return(TRUE);
   }
/************************************************************************
 *
 * Name: populate_bounding_region()
 *
 * Description:
 *
 *
 *     This function populates and verifies validity for
 *     interpolation of the bounding points of a color in a
 *     3 or 4-dimensional look-up-table.  Values for the bounding points
 *     in n-dimensions are derived using populate_cube().  After
 *     populating the containing cube(s), verify_cube() is called to
 *     verify the validity of interpolation within the grid.
 *     Finally, the bit for the region containing the color is
 *     tested, and its value returned.
 *
 * Arguments:
 *
 *     t               - Pointer to color table containing region to
 *                       be populated.
 *     indices         - Indices of lower bound to be populated.
 *     do_verify       - Indicates whether or not to perform
 *                       verification.  Verification is not performed
 *                       when using the "fast" truncation method
 *                       since it adds no value.
 *
 * Return:
 *
 *     1       - Success.
 *     0       - Failure.  Possible causes of failure:
 *                     Unable to allocate memory for region.
 *
 ************************************************************************
 /
STATIC int32 populate_bounding_region(colorTablePtr t, int32 indices[4],
                            uint8 input_space, uint8 output_space,
                            int32 do_verify)
{
   register USERVALUE swapu ;   /* temporary for swapping floats */
   register int32 a, b, c, d ;   /* indices */
```

```
        uint32          ia[2], ib[2], ic[2], id[2] ;
        fourColorCubePtr    *mini_cube[16];
        USERVALUE       sa[2], sb[2], sc[2], sd[2];
        USERVALUE       aInc, bInc, cInc, dInc;
5       int32           result;
        int32           i ;
        SYSTEMVALUE     *range;
        int32           nd ;
        int32           ndims ;
10
        HQASSERT(t.tn != NULL, "No colour table pointer in
        populate_bounding_region");

ndims = t.tn->ndims ;
15
            /***********************************************
            * Get the values at the 8-bounding corners of cube.
            ***********************************************/
            switch((int32)input_space)
20          {
            case SPACE_CIEBasedA:
                HQFAIL("Multi-dimensional caching invalid for one-dimension");
                range = NULL;
                break;
25          case SPACE_CIEBasedABC:
                range = thegsCIERangeABC(gstate);
                break;
            case SPACE_CIETable3:
            case SPACE_CIETable4:
30              range = theIgsCIETableRange(&gstate);
                break;
            case SPACE_DeviceRGB:
            case SPACE_DeviceCMYK:
                range = identityRange;
35          break;
            case SPACE_DeviceGray:
                HQFAIL("Multi-dimensional caching invalid for one-dimension");
                range = NULL;
                break;
40          default:
                HQFAIL("Unknown or unsupported color-space\n");
                return 0 ;
            }

45      /* Get the indicies */
        ia[0] = (uint32)indices[0];
```

```
            ia[1] = ia[0] >= t.tn->tableAsize ? t.tn->tableAsize : ia[0] + 1;

ib[0] = (uint32)indices[1];
            ib[1] = ib[0] >= t.tn->tableBsize ? t.tn->tableBsize : ib[0] + 1;
 5
            ic[0] = (uint32)indices[2];
            ic[1] = ic[0] >= t.tn->tableCsize ? t.tn->tableCsize : ic[0] + 1;

/* Determine the mini-cube coordinates/addresses */
10          if ( ndims == 3 ) {
              i = 0 ;
              for ( a = 0 ; a < 2 ; a++ )
                for ( b = 0 ; b < 2 ; b++ )
                  for ( c = 0 ; c < 2 ; c++ )
15                    mini_cube[i++] = (fourColorCubePtr *)&GET_3MINI(t, ia[a], ib[b],
            ic[c]);

/* If the minicubes are all non-null, then we return zero because
             * we've visited this part of the space before, and determined that
20           * interpolation is not valid in this region.
             */
            if ((*mini_cube[0]).c3 && (*mini_cube[1]).c3 && (*mini_cube[2]).c3 &&
                (*mini_cube[3]).c3 && (*mini_cube[4]).c3 && (*mini_cube[5]).c3 &&
                (*mini_cube[6]).c3 && (*mini_cube[7]).c3)
25            return 0 ;

id[0] = id[1] = 0 ;

dInc = sd[0] = sd[1] = (USERVALUE)0.0;
30          nd = 1 ;
            } else {
            id[0] = indices[3] ;
            id[1] = id[0] >= t.tn->tableDsize ? t.tn->tableDsize : id[0] + 1 ;

35          i = 0 ;
            for ( a = 0 ; a < 2 ; a++ )
              for ( b = 0 ; b < 2 ; b++ )
                for ( c = 0 ; c < 2 ; c++ )
                  for ( d = 0 ; d < 2 ; d++ )
40                    mini_cube[i++] = (fourColorCubePtr *)&GET_4MINI(t, ia[a], ib[b],
            ic[c], id[d]) ;

/* If the minicubes are all non-null, then we return zero because
             * we've visited this part of the space before, and determined that
45           * interpolation is not valid in this region.
             */
```

```
        if ((*mini_cube[0]).c4 && (*mini_cube[1]).c4 && (*mini_cube[2]).c4 &&
            (*mini_cube[3]).c4 && (*mini_cube[4]).c4 && (*mini_cube[5]).c4 &&
            (*mini_cube[6]).c4 && (*mini_cube[7]).c4 && (*mini_cube[8]).c4 &&
            (*mini_cube[9]).c4 && (*mini_cube[10]).c4 && (*mini_cube[11]).c4 &&
            (*mini_cube[12]).c4 && (*mini_cube[13]).c4 && (*mini_cube[14]).c4 &&
            (*mini_cube[15]).c4)
          return 0 ;

/* see comments below */
        id[0] = MINI_TRUNC(id[0]);
        id[1] = MINI_TRUNC(id[1]);

dInc = (USERVALUE)(1.0 / t.tn->factD);

sd[0] = (USERVALUE)(id[0] * dInc + range[6]);
        sd[1] = (USERVALUE)(id[1] * dInc + range[6]);
        nd = 2 ;
    }

/* Truncate to the mini-cube boundaries */
    ia[0] = MINI_TRUNC(ia[0]);
    ia[1] = MINI_TRUNC(ia[1]);
    ib[0] = MINI_TRUNC(ib[0]);
    ib[1] = MINI_TRUNC(ib[1]);
    ic[0] = MINI_TRUNC(ic[0]);
    ic[1] = MINI_TRUNC(ic[1]);

/* Set up component variables and start values for minicubes */
    aInc = (USERVALUE)(1.0 / t.tn->factA);
    sa[0] = (USERVALUE)(ia[0] * aInc + range[0]);
    sa[1] = (USERVALUE)(ia[1] * aInc + range[0]);

bInc = (USERVALUE)(1.0 / t.tn->factB);
    sb[0] = (USERVALUE)(ib[0] * bInc + range[2]);
    sb[1] = (USERVALUE)(ib[1] * bInc + range[2]);

cInc = (USERVALUE)(1.0 / t.tn->factC);
    sc[0] = (USERVALUE)(ic[0] * cInc + range[4]);
    sc[1] = (USERVALUE)(ic[1] * cInc + range[4]);

populating_tables++ ;   /* Prevent purging of current table */

/* Loop through the cubes allocating and initializing them. This loop swaps
       the values in the start and index arrays each time. If the loop completes,
       it will have been through each swap an even number of times, so the
       values will be as they were at the start. This method is used so that
```

```
      the bounding indices can be passed through to empty_mini_cube, which
      needs them to lock down neighbours of the cube it's populating when
      recycling the cache. Since the array indices are constant, the compiler
      should be able to work out the address of each of them, and it should
 5    compile reasonably. */
   i = 0 ;
   a = 2 ;
   do {
    b = 2 ;
10   do {
     c = 2 ;
     do {
      d = nd ;
      do {
15     if ( (*mini_cube[i]).cn == NULL) {
         *mini_cube[i] = empty_mini_cube(t, ia, ib, ic, id) ;

if ( (*mini_cube[i]).cn == NULL ) {
           populating_tables-- ;   /* Allow purging of current table */
20         return 0 ;
         } populate_cube(*mini_cube[i], ndims,
                   (USERVALUE)sa[0], (USERVALUE)sb[0],
25                 (USERVALUE)sc[0], (USERVALUE)sd[0],
                   aInc, bInc, cInc, dInc, input_space, output_space);
       }
       i++ ;
       id[0] ^= id[1] ; id[1] ^= id[0] ; id[0] ^= id[1] ;
30     swapu = sd[0] ; sd[0] = sd[1] ; sd[1] = swapu ;
      } while ( --d ) ;
      ic[0] ^= ic[1] ; ic[1] ^= ic[0] ; ic[0] ^= ic[1] ;
      swapu = sc[0] ; sc[0] = sc[1] ; sc[1] = swapu ;
     } while ( --c ) ;
35   ib[0] ^= ib[1] ; ib[1] ^= ib[0] ; ib[0] ^= ib[1] ;
     swapu = sb[0] ; sb[0] = sb[1] ; sb[1] = swapu ;
    } while ( --b ) ;
    ia[0] ^= ia[1] ; ia[1] ^= ia[0] ; ia[0] ^= ia[1] ;
    swapu = sa[0] ; sa[0] = sa[1] ; sa[1] = swapu ;
40  } while ( --a ) ;

/* Pass cube base indices and number of sub-cubes to verify on each axis */
   if ( verify_cube(t, ia[0], ib[0], ic[0], id[0], ia[1], ib[1], ic[1], id[1],
              input_space, output_space, do_verify) ) {
45   /* Determine whether interpolation is valid in the region */
    cbm_getbit(t.tn->bitTable, ndims, indices, &result) ;
```

```
      } else
        result = 0 ;

populating_tables-- ;     /* Allow purging of current table */ return(result);
    }

/***********************************************************************
     *
     * Name: populate_cube()
     *
     * Description:
     *
     *      This function populates the grid points of a "mini-cube". It
     *      does this by calling transform_color() which
     *      executes the PostScript associated with CIEbasedABC color
     *      spaces to transform the color. It assumes that the cube has
     *      been allocated contiguously such that the pointers are at the
     *      head of the memory, and the data is contiguous with the
     *      c-dimension varying most rapidly, and the a-dimension varying
     *      least rapidly.
     *
     * Arguments:
     *
     *      cube    - fourColorCube which has been allocated,
     *                and pointers initialized, but with empty, obsolete,
     *                or otherwise uninitialized contents.
     *      ndims         - Number of dimensions in cube (3 or 4)
     *      aStart        - Starting value for the "a" dimension.
     *      bStart        -  "       "    "      b       "
     *      cStart -  "       "    "      c       "
     *      cStart -  "       "    "      d       "
     *      aInc    - Increment for a dimension.
     *      bInc    -  "       " b  "
     *      cInc    -  "       " c  "
     *      cInc    -  "       " d  "
     *
     * Return:
     *
     *      FALSE      - Success
     *      TRUE       - Failure. Failure caused by error return from
     *                 transform_color().
     *
```

```
/******************************************************************
 /
 STATIC int32 populate_cube(fourColorCubePtr cube, int32 ndims,
                 USERVALUE aStart, USERVALUE bStart,
                 USERVALUE cStart, USERVALUE dStart,
                 USERVALUE aInc, USERVALUE bInc,
                 USERVALUE cInc, USERVALUE dInc,
                 uint8 input_space, uint8 output_space)
 {
   fourColor   *val ;
   USERVALUE   icolor[4] ;
   uint32      a, dCount ;

HQASSERT(populating_tables,
         "populate_cube not called from populate_bounding_region") ;

if (ndims == 3)
    {
      val = &(cube.c3->cube[0][0][0]) ;
      dCount = 1;
    }
   else
    {
      val = &(cube.c4->cube[0][0][0][0]) ;
      dCount = CUBE_SIDE;
    }

/* Unfortunately, we need to populate the cube with the loop this way out
      because the fastest moving index (the d index) needs to be in the inner
      loop */
   a = CUBE_SIDE ;
   icolor[0] = aStart ;
   do
    {
      uint32 b = CUBE_SIDE;
      icolor[1] = bStart ;
      do
        {
          uint32 c = CUBE_SIDE;
          icolor[2] = cStart ;
          do
           {
             uint32 d = dCount ;
             icolor[3] = dStart ;
```

```
                SwOftenUnsafe() ;

do
            {
                USERVALUE    ocolor[4] ;
                uint8        spacep;

/* Determine the device value for the color */
                if (!transform_color(input_space, icolor,
                                     output_space, ocolor,
                                     &spacep))
                    return(FALSE);

/* Store the device value in the fourColor struct */
                val->a = ocolor[0];
                val->b = ocolor[1];
                val->c = ocolor[2];
                val->d = ocolor[3];
                val++;

/* Increment color to the next grid-point */
                icolor[3] += dInc;
            } while ( --d ) ;
            icolor[2] += cInc;
        } while ( --c ) ;
        icolor[1] += bInc;
    } while ( --b ) ;
    icolor[0] += aInc;
    } while ( --a ) ;
    return TRUE ;
}

/*******************************************************************
 *
 * Name: verify_cube()
 *
 * Description:
 *
 *
 *      This function tests the validity of interpolation for each of
 *      the grid-points in a "mini-cube". To do this, each grid-point
 *      is derived by interpolation. Therefore the neighboring
 *      grid-points must also populated. To verify that interpolation
 *      is valid, the center point is computed by 3-dimensional
 *      interpolation, and by transform_color(). The
```

```
 *     results of these two techniques are then compared.  If the
 *     difference between the two is less than some small epsilon the
 *     bit in the interpolation_is_valid table is set.  If the
 *     difference is greater than epsilon then the bit is not set.
 *
 * Arguments:
 *
 *     t       - colorTable containing the region to be
 *               tested.
 *     loA     - Start   "A" index.
 *     loB     -   "     B   "
 *     loC     -   "     C   "
 *     loD     -   "     D   "
 *     hiA     - End     "A" index.
 *     hiB     -   "     B   "
 *     hiC     -   "     C   "
 *     hiD     -   "     D   "
 *     do_verify  If non-zero, perform verification as described
 *               above.  If zero, just set the bit as if it was
 *               valid for interpolation without testing.  This mode
 *               is used when using the "fast" truncation plus noise
 *               method since there's no need in verifying the cube
 *               because what would we do differently if it was
 *               invalid?
 *
 * Return:
 *
 *     TRUE      - Success.
 *     FALSE     - Failure.
 *

**********************************************************************
 /

STATIC int32 verify_cube(colorTablePtr t,
                uint32 loA, uint32 loB, uint32 loC, uint32 loD,
                uint32 hiA, uint32 hiB, uint32 hiC, uint32 hiD,
                uint8 input_space, uint8 output_space,
                int32 do_verify)
{
    USERVALUE     icolor[4], tcolor[4];
    USERVALUE     aInc, bInc, cInc, dInc;
    USERVALUE     saveA0, saveB0, saveC0;
    uint32        ncolors;
    uint8         spacep;
    USERVALUE     err_mag;    /* Magnitude of the error vector */
```

```
        USERVALUE    tf;           /* Temporary float value */
        USERVALUE    tolerance;    /* Acceptable error vector max. */
        int32        index[4];     /* Current cube corner index a,b,c,d */
        SYSTEMVALUE  *range;       /* Range of values for a,b,c,d */
5       int32        resetSpace;   /* Do we store the output color space? */
        int32        result;       /* Have we already certified this
        region? */
        int32        ndims ;

10      HQASSERT(MINI_REM(loA) == 0 && MINI_REM(loB) == 0 &&
                 MINI_REM(loC) == 0 && MINI_REM(loD) == 0,
                 "verify_cube low index isn't a minicube boundary") ;

HQASSERT(MINI_REM(hiA) == 0 && MINI_REM(hiB) == 0 &&
15               MINI_REM(hiC) == 0 && MINI_REM(hiD) == 0,
                 "verify_cube high index isn't a minicube boundary") ;

HQASSERT(t.tn, "No colour table in verify_cube") ;

20      ndims = t.tn->ndims ;

/* Figure out the indices of the containing mini-cube(s) clipped to
         * table dimensions. Note that we back up one cube less in each dimension
         * on the low-end. This is because potentially we're completing a region
25       * which was previously untestable. If we don't back up, we'll never know.
         * Similarly, our verification will attempt to increment each by one to
         * test the last bin in the set. Therefore we have to clip to boundary
         * TABLE_SIDE - 1.
         */
30      if ( loA ) loA-- ;
        if ( (hiA += CUBE_SIDE) >= t.tn->tableAsize )
          hiA = t.tn->tableAsize ;
        hiA = hiA - loA + 1 ;  /* Convert index to number of cubes */

35      if ( loB ) loB-- ;
        if ( (hiB += CUBE_SIDE) >= t.tn->tableBsize )
          hiB = t.tn->tableBsize ;
        hiB = hiB - loB + 1 ;  /* Convert index to number of cubes */

40      if ( loC ) loC-- ;
        if ( (hiC += CUBE_SIDE) >= t.tn->tableCsize )
          hiC = t.tn->tableCsize ;
        hiC = hiC - loC + 1 ;  /* Convert index to number of cubes */

45      if ( loD ) loD-- ;
        if ( ndims == 4 ) {
```

```
        if ( (hiD += CUBE_SIDE) >= t.tn->tableDsize )
          hiD = t.tn->tableDsize ;
        hiD = hiD - loD + 1 ;
      } else
        hiD = 1 ;

HQASSERT(hiA > 0 && hiB > 0 && hiC > 0 && hiD > 0,
                "Number of sub-cubes to verify is wrong in verify_cube") ;

resetSpace = 0;         /* init */
        switch((int32)input_space)
        {
        case SPACE_CIEBasedA:
          HQFAIL("Multi-dimensional caching invalid for one-dimension");
          range = NULL;
          break;
        case SPACE_CIEBasedABC:
          range = thegsCIERangeABC(gstate);
          break;
        case SPACE_CIETable3:
        case SPACE_CIETable4:
          range = theIgsCIETableRange(&gstate);
          break;
        case SPACE_DeviceRGB:
        case SPACE_DeviceCMYK:
          range = identityRange;
          break;
        case SPACE_DeviceGray:
          HQFAIL("Multi-dimensional caching invalid for one-dimension");
          range = NULL;
          break;
        default:
          HQFAIL("Unknown or unsupported color-space\n");
          return 0 ;
        }

/* Compute the starting color values, and increments. Initial location is at
           mid-point of cube, so we add the increment, i.e. the delta from one grid
           point to the next, and divide by two. */
        aInc = (USERVALUE)1.0/t.tn->factA;
        saveA0 = (USERVALUE)(loA * aInc + aInc / (USERVALUE)2.0 + range[0]) ;

bInc = (USERVALUE)1.0/t.tn->factB;
        saveB0 = (USERVALUE)(loB * bInc + bInc / (USERVALUE)2.0 + range[2]) ;

cInc = (USERVALUE)1.0/t.tn->factC;
```

```
        saveC0 = (USERVALUE)(loC * cInc + cInc / (USERVALUE)2.0 + range[4]) ;

if ( ndims == 3 ) {
          dInc = (USERVALUE)0.0 ;
5         icolor[3] = (USERVALUE)0.0 ;
        } else {
          /* Compute the starting color values, and increments. */
          dInc = (USERVALUE)1.0/t.tn->factD ;
          icolor[3] = (USERVALUE)(loD * dInc + dInc / (USERVALUE)2.0 + range[6]) ;
10      } switch((int32)output_space)
          {
          case SPACE_DeviceRGB:
15          ncolors = 3;
            break;
          case SPACE_DeviceCMYK:
            ncolors = 4;
            break;
20        case SPACE_DeviceGray:
            ncolors = 1;
            break;
          default:
            return(0);
25        } tolerance = ncolors * ERROR_TOLERANCE * ERROR_TOLERANCE;

index[3] = loD ;
30      do
          {
          uint32 tc = hiC ;

if ( ndims == 4 ) {
35             icolor[3] = (USERVALUE)CLIP_TO_RANGE(icolor[3], range[6],
        range[7]);
               tcolor[3] = (USERVALUE)OFFSET_AND_SCALE(icolor[3], range[6],
                                          t.tn->factD) ;
          }
40
          index[2] = loC;
          icolor[2] = saveC0;
          do
             {
45             uint32 tb = hiB ;
```

```
            icolor[2] = (USERVALUE)CLIP_TO_RANGE(icolor[2], range[4],
range[5]);
            tcolor[2] = (USERVALUE)OFFSET_AND_SCALE(icolor[2], range[4],
                                    t.tn->factC);

index[1] = loB;
            icolor[1] = saveB0;

do
            {
                uint32 ta = hiA ;

SwOftenUnsafe() ;

icolor[1] = (USERVALUE)CLIP_TO_RANGE(icolor[1], range[2],
range[3]);
                tcolor[1] = (USERVALUE)OFFSET_AND_SCALE(icolor[1], range[2],
                                        t.tn->factB);

index[0] = loA;
                icolor[0] = saveA0;
                do
                {
                    /* If we havn't already verified this region,
                     * Verify that we have all the necessary mini-cubes.
                     */
                    cbm_getbit(t.tn->bitTable, ndims, index, &result);
                    if (!result && all_cubes_populated(t, (uint32)index[0],
                                        (uint32)index[1],
                                        (uint32)index[2],
                                        (uint32)index[3]))
                    {
                        if (!do_verify)
                        {
                            cbm_setbit(t.tn->bitTable, ndims, index);
                        }
                        else
                        {
                            USERVALUE xformColor[4], interpColor[4] ;

icolor[0] = (USERVALUE)CLIP_TO_RANGE(icolor[0],
                                                range[0],
                                                range[1]);
                            tcolor[0] =
(USERVALUE)OFFSET_AND_SCALE(icolor[0],
                                                range[0],
```

```
                                    t.tn->factA);

/* We'd be out of range for the final cube
         * (since we add 1/2 the grid distance), so we
         * must clip to the range here.  This is really
         * only needed for the last cube, but putting
         * the test here means we don't have to put it
         * inside the interpolator which gets a much
         * higher call rate hopefully.
         */ if ( ndims == 3 )
            linearInterpolate3d(tcolor, interpColor, ncolors, t,
index);

else
            linearInterpolate4d(tcolor, interpColor, ncolors, t,
index);

if (!transform_color(input_space, icolor,
                             output_space, xformColor,
                             &spacep))
          return(0);

resetSpace = 1;

/* Compute error vector a^2 + b^2 + c^2 + d^2 */
        tf = (interpColor[0] - xformColor[0]);
        err_mag = tf * tf;
        if (ncolors >= 3)
          {
            tf = interpColor[1] - xformColor[1];
            err_mag += tf * tf;
            tf = interpColor[2] - xformColor[2];
            err_mag += tf * tf;
            if (ncolors == 4)
                {
                  tf = interpColor[3] - xformColor[3];
                  err_mag += tf * tf;
                }
          }
        if (err_mag > tolerance)
          {
            cbm_clearbit(t.tn->bitTable, ndims, index);
          }
        else
```

37

```
                        {
                            cbm_setbit(t.tn->bitTable, ndims, index);
                        }
                    }
                }
                /* Increment the indices */
                index[0]++;
                icolor[0] += aInc;
            } while(--ta);
            index[1]++;
            icolor[1] += bInc;
        } while(--tb);
        index[2]++;
        icolor[2] += cInc;
    } while(--tc);
    index[3]++;
    icolor[3] += dInc;
} while(--hiD);

if (resetSpace)
    t.tn->ospace = spacep;

return(1);
}
```

```
/***********************************************************************
 *
 * Name: invalidate_region
 *
 * Description:
 *
 *     This function marks a section of a color table as invalid.
 *     This is required when a previously allocated mini-cube is
 *     being reused in another color table, or in another region of
 *     the same color table.
 *
 * Arguments:
 *
 *     t     - Pointer to color table to have region invalidated.
 *     loa   - Lowest index in A dimension to be invalidated.
 *     lob   _ "    "    " B "    " "    "
 *     loc   _ "    "    " C "    " "    "
 *     lod   _ "    "    " D "    " "    "
 *     ndims - Number of dimensions.
```

```
 *
 * Return:
 *
 *     None
 *
 *
 **********************************************************************
/
STATIC void invalidate_region(colorTablePtr t, uint32 loA, uint32 loB,
                  uint32 loC, uint32 loD)
{
    uint32    noA, noB, noC, noD ;
    int32     index[4];
    uint32    *bTable;
    int32     ndims ;

HQASSERT(t.tn != NULL, "No colour table pointer in invalidate_region");

HQASSERT(MINI_REM(loA) == 0 && MINI_REM(loB) == 0 &&
        MINI_REM(loC) == 0 && MINI_REM(loD) == 0,
            "invalidate_region called at non-minicube boundary") ;

ndims = t.tn->ndims ;
    bTable = t.tn->bitTable;

/* Clear the reference to the cube from the cubeTable */
    if ( ndims == 3 ) {
        t.t3->cubeTable[I_TO_MINI(loA)][I_TO_MINI(loB)][I_TO_MINI(loC)] =
NULL;
        HQASSERT(loD == 0, "invalidate_region called with 3d table and non-zero d")
;
        noD = 1;
    } else {
        t.t4->cubeTable[I_TO_MINI(loA)][I_TO_MINI(loB)][I_TO_MINI(loC)]
        [I_TO_MINI(loD)] = NULL;

/* See comment below */
    HQASSERT(loD + CUBE_SIDE - 1 <= t.tn->tableDsize,
            "Cube size overflow in invalidate_region") ;
    if ( loD ) {
        loD-- ;
        noD = CUBE_SIDE + 1 ;
    } else
        noD = CUBE_SIDE ;
```

}

```
      /* Have to invalidate surrounding region, which was validated assuming that
 5       this cube was populated. Set no* to number of sub-cubes to invalidate. We
         don't need to invalidate the cubes one beyond the current cube, because
         interpolation on them is still valid when the current cube is invalid.
         Since we start at a minicube boundary, adding CUBE_SIDE - 1 should never
10       overflow the table size */
      HQASSERT(loA + CUBE_SIDE - 1 <= t.tn->tableAsize,
               "Cube size overflow in invalidate_region") ;
      HQASSERT(loB + CUBE_SIDE - 1 <= t.tn->tableBsize,
               "Cube size overflow in invalidate_region") ;
15    HQASSERT(loC + CUBE_SIDE - 1 <= t.tn->tableCsize,
               "Cube size overflow in invalidate_region") ;

if ( loA ) {
        loA-- ;
20      noA = CUBE_SIDE + 1 ;
      } else
        noA = CUBE_SIDE ;
      if ( loB ) {
        loB-- ;
25      noB = CUBE_SIDE + 1 ;
      } else
        noB = CUBE_SIDE ;
      if ( loC ) {
        loC-- ;
30      noC = CUBE_SIDE + 1 ;
      } else
        noC = CUBE_SIDE ;

/* Clear all the status bits in the bit-table */
35    index[3] = loD ;
      do
        {
          uint32 j = noC ;
          index[2] = loC ;
40        do
            {
              uint32 k = noB ;
              index[1] = loB ;
              do
45              {
                  uint32 l = noA ;
```

```
            index[0] = loA ;
            do
             {
               cbm_clearbit(bTable, ndims, index);
               index[0]++;
             } while ( --l ) ;
             index[1]++;
           } while ( --k ) ;
          index[2]++;
        } while ( --j ) ;
       index[3]++;
     } while ( --noD ) ;
}

/*******************************************************************
 *
 * Name: scavenge_mini_cube
 *
 * Description:
 *
 *    This function scavenges the tail-most (i.e. least recently
 *    allocated, not least recently used) mini-cube from the least
 *    recently used color rendering table. The current table is
 *    always at the head of the list, and contains pointers to link
 *    it forward, and backward. We chase to the end of this list
 *    (typically a very small number of tables), and snag the "last"
 *    mini-cube attached to that table. This mini-cube is then
 *    invalidated for that color table, and it's address is returned
 *    for recycling. If returning this cube to another color table
 *    causes there to be no remaining cubes, the color-rendering
 *    table is flushed entirely.
 *
 * Arguments:
 *
 *    t     - Current color table.
 *
 * Return:
 *
 *    NULL   - indicates no sub-cubes left in the system for
 *             recycling.
 *

*******************************************************************
/
STATIC fourColorCubePtr scavenge_mini_cube(colorTablePtr t)
{
```

```
       colorTableNd  *this, *cur;
       fourColorCubePtr    cube;
       uint32      coords;

5     HQASSERT(t.tn->prev == NULL,
             "current color table is not at head of list?!\n");

/* Chase to the end of the list, finding last table with cubes */
       for (this = t.tn, cur = NULL ; this ; this = this->next)
10       if ( t.tn->ndims == this->ndims && this->cache.cur > 0 )
          cur = this ;

if ( cur == NULL ) {  /* No cubes in any tables */
         cube.cn = NULL ;
15       return cube ;
       }

/* Snag the cube, backup the links */
       cube = cur->cache.last;
20     cur->cache.last = cube.cn->prev;
       if (cube.cn->prev.cn != NULL)
         {
           cur->cache.last.cn->next.cn = NULL;
         }
25     else
         {
           HQASSERT(cur->cache.cur == 1, "Corruption in the mini-cube list\n");
         }

30     /* Invalidate the cube */
       coords = cube.cn->coords;
       t.tn = cur;

invalidate_region(t, (coords >> 24), ((coords >> 16) & 0xff),
35             ((coords >> 8) & 0xff), (coords & 0xff));
       cur->cache.cur--;

return(cube);
     }
40
     /************************************************************************
      *
      * Name: alloc_mini_cube()
      *
45    * Description:
      *
```

```
        (void)current_global_cube_count(1);

return(cube);
}
/***********************************************************************
 *
 * Name: empty_mini_cube()
 *
 * Description:
 *
 *      This function either allocates, or scavenges from the cache
 *      a mini-cube.
 *
 * Arguments:
 *
 *      t       - colorTable to receive the cube.
 *      a       - coordinate in the A dimension of the mini-cube.
 *      b       -  "     "    "   "  "     "      "   "    "
 *      c       -  "     "    "   "  "     "      "   "    "
 *      d       -  "     "    "   "  "     "      "   "    "
 *
 * Return:
 *
 *      NULL    - Failure. Unable to allocate memory for mini-cube,
 *                and no cubes in the cache.
 *

***********************************************************************
/
STATIC fourColorCubePtr empty_mini_cube(colorTablePtr t, uint32 ia[2],
uint32
ib[2],
                        uint32 ic[2], uint32 id[2])
{
    timeClock   *cache;
    int32       gcubecount;
    fourColorCubePtr    cube;

HQASSERT(MINI_REM(ia[0]) == 0 && MINI_REM(ib[0]) == 0 &&
        MINI_REM(ic[0]) == 0 && MINI_REM(id[0]) == 0,
        "empty_mini_cube called at non-minicube boundary") ;

HQASSERT(MINI_REM(ia[1]) == 0 && MINI_REM(ib[1]) == 0 &&
        MINI_REM(ic[1]) == 0 && MINI_REM(id[1]) == 0,
```

```
 *      This function allocates and initializes all the pointers
 *      necessary for a mini-cube, and increments the global
 *      count of cubes in use.
 *
 * Arguments:
 *
 *      ndims   - Number of dimensions for mini-cube
 *
 * Return:
 *
 *      NULL    - Failure. Unable to allocate memory for region.
 *

************************************************************************
 /
STATIC fourColorCubePtr alloc_mini_cube(int32 ndims)
{
  fourColorCubePtr    cube;
  uint32      size;

if (ndims == 3)
    size = sizeof(fourColor3cube);
  else
    size = sizeof(fourColor4cube);

if ((cube.c3 = (fourColor3cube *)CIEMALLOC(size)) == NULL)
  {
    int32    action;

/* If that fails, loop over the reclaim procedures until
     * we get enough back to alloc the buffer.
     */
    action = 0;
    do
    {
        /* Attempt to reclaim, Only try font cache since it's REAL
         * likely we're working on an image if we get here.
         */
        if ( (action = handleLowMemory(action, TRY_FONTCACHE)) > 0 )
           cube.c3 = (fourColor3cube *)CIEMALLOC(size);
    } while((action > 0) && (cube.c3 == NULL));
    if (cube.c3 == NULL)
      return(cube);
  }

/* Increment the count of alloc'ed cubes */
```

```
            "empty_mini_cube called with neighbours at non-minicube
        boundary") ;

cache = &t.tn->cache;
5       cube.cn = NULL;

HQASSERT((cache->cur <= cache->max) && (cache->cur <=
        MAX_TOTAL_CUBES),
            "Current mini-cube count exceedes limits\n");
10
        /* Check to see if we've reached our global maximum number of
         * allocated sub-cubes. But beware that we're not going to needlessly
         * steal a cube from some other family. i.e. we can use the cube in
         * our current family.
15       */
        gcubecount = current_global_cube_count(0);
        HQASSERT((gcubecount >= 0) && (gcubecount <= MAX_TOTAL_CUBES),
            "Total cube count in cache out of range\n");
        HQASSERT(cache->max > 0,
20          "Meaningless maximum cache dimension for color table\n");

/* Check to see if we've filled our cache of mini-cubes.
         * If we have, we have to get one from the list, but it shouldn't be an
         * adjacent mini-cube, in case we need to interpolate between it and this
25       * one. When we've removed one, move it to head of the list, clear it's
         * bits in the bit-table (and all of the sub-cubes it affects), and return
         * it.
         */
        if (cache->cur == cache->max) /* Are we at the local maximum? */
30       {
            cube = cache->last ;

/* Get a non-neighbour cube from the cache, starting at the least
               recently created cube. */
35          do {
                register uint32 a, b, c, d ;
                uint32 coords = cube.cn->coords ;

a = (coords >> 24) ;
40              b = ((coords >> 16) & 0xff) ;
                c = ((coords >> 8) & 0xff) ;
                d = (coords & 0xff) ;

if ( (a != ia[0] && a != ia[1]) || (b != ib[0] && b != ib[1]) ||
45                  (c != ic[0] && c != ic[1]) || (d != id[0] && d != id[1]) ) {
                    invalidate_region(t, a, b, c, d) ;
```

```
            break ;
        } cube = cube.cn->prev ;
5   } while ( cube.cn ) ;

if ( cube.cn == NULL ) /* Panic, we couldn't find a non-neighbour cube */
        return cube ;

10      /* Remove element from list */
        if ( cube.cn->next.cn == NULL ) { /* Are we at the end? */
            HQASSERT( cache->last.cn == cube.cn, "Cube list end corrupted" ) ;
            cache->last = cube.cn->prev ;
        } else {
15          HQASSERT( cache->last.cn != cube.cn, "Cube list end corrupted" ) ;
            cube.cn->next.cn->prev = cube.cn->prev ;
        } if ( cube.cn->prev.cn == NULL ) { /* Are we at the start? */
20          HQASSERT( cache->first.cn == cube.cn, "Cube list start corrupted" ) ;
            cache->first = cube.cn->next ;
        } else {
            HQASSERT( cache->first.cn != cube.cn, "Cube list start corrupted" ) ;
            cube.cn->prev.cn->next = cube.cn->next ;
25      }

/* Decrement the count since it'll be incremented at the bottom
         * of the function prior to returning, but we havn't actually
         * increased the count of cubes attached to this list.
30       */
        cache->cur-- ;
    } else if ( gcubecount == MAX_TOTAL_CUBES ) { /* Global maximum? */
        cube = scavenge_mini_cube(t);
        HQASSERT(cube.cn != NULL, "NULL cube returned when at max-total
35  cubes");
    } else {
        /* If we're not at either the global max, or local max, attempt to
         * add a cube to the list by allocating one. If that fails, scavenge
         * one from the global cache. If that fails, return a zero, we've got
40       * no space for caching.
         */
        cube = alloc_mini_cube(t.tn->ndims);
        if (cube.cn == NULL)
        {
45          cube = scavenge_mini_cube(t);
            if (cube.cn == NULL)
```

```
            {
              HQASSERT(gcubecount == 0,
                  "Failed to scavenge with non-zero global cube count");
              return(cube);
 5          }
          }
        }

/* Update the cache pointers and coordinates. Increment the count */
10      cube.cn->prev.cn = NULL;
        cube.cn->next = cache->first;

cube.cn->coords = (ia[0] << 24) | (ib[0] << 16) | (ic[0] << 8) | id[0];

15      /* If this is the first cube we're allocating, put it at the tail
         * of the list.  Otherwise create the backward link from the previous
         * first cube to the new one.
         */
        if (cache->cur == 0)
20        cache->last = cube;
        else
          cache->first.cn->prev = cube;
        cache->first = cube;
        cache->cur++;
25      return(cube);

}

**
      ** There are three sections.  The first two are used for the multi-
30    ** dimensional bit-tables.  One controls the mapping from user
      ** coordinates to bitmap indexes, depending on the current color
      ** space.  The second involves accessing the bitmap based on those
      ** coordinates.  The third section is used for accessing cubes within
      ** mini-cubes within sparsely populated color tables.
35    **
      */ define CBM_MAX_DIMS    4

40    /* -------------------------------------------------
      ** User coordinate to bit index mapping.
      */

/* private structure definitions.
45    */
```

```
      typedef struct {
        USERVALUE lowest;      /* lowest legal value; also subtract from user val */
        USERVALUE highest;     /* highest legal value */
 5      USERVALUE scale_factor; /* what to multiply user value by for conversion
        */
      } CBM_RANGE;

typedef struct {
10      CBM_RANGE r[CBM_MAX_DIMS];
        int32 dimensions;
      } CBM_MAP;

15    /* public interface.
      */

/* Map from a user color "in" (USERVALUE within range specified in the
      ** gstate) to a bit index "pout" (uint32 between 0 and 31 inclusive).
20    ** Use the color mapping info saved in cbmmap (a CBM_MAP *), and access
      ** color with index "index".  For instance, A, B and C have indexes 0,
      ** 1, and 2, respectively.
      */
      #define UVToBitIndex(in, pout, cbmmap, index) \
25      MACRO_START \
        USERVALUE v = (in); \
        CBM_RANGE *pr; \
        \
        HQASSERT(index < cbmmap->dimensions, "too many dimensions for this
30    space"); \
        pr = cbmmap->r + index; \
        if (v < pr->lowest) \
          v = pr->lowest; \
        else if (v > pr->highest) \
35        v = pr->highest; \
        pout = (uint32) (((v - pr->lowest) * pr->scale_factor) + (USERVALUE) 0.5); \
      MACRO_END /*------------------------------------------------
40    ** Bitmap access.
      */

/* private definitions.
      */
45
      #define BIT_INDEXBITS  5
```

```
       #define BIT_INDEXLEN   (1 << BIT_INDEXBITS)
       #define BIT_INDEXMASK  (BIT_INDEXLEN - 1)

/* ----------------------------------------------------------------
 5     ** MACROS/FUNCTIONS TO ACCESS BY BITINDEX ARRAY.
       */

/* The number of lower-order bits in a bit address that can be
       ** accounted for within a single uint32.
10     */
       #define BITS_IN_INT32   5

/* This is a less-than modular macro, but it lets us avoid rewriting code
       ** many times.
15     */
       #define BITACCESS_GUTS(bitindex, dimensions) \
         register int32 *pcol = bitindex; \
         register int32 offset = 0; \
         \
20       HQASSERT(BitmapSanity(bitindex, dimensions), "Should not be reached"); \
         \
         \
         switch (dimensions) { \
         case 4: \
25         offset = (offset << BIT_INDEXBITS) | *pcol++; \
           /* FALL THROUGH */ \
         case 3: \
           offset = (offset << BIT_INDEXBITS) | *pcol++; \
           offset = (offset << BIT_INDEXBITS) | *pcol++; \
30         break; \
         case 1: \
           break; \
         default: \
           HQFAIL("Dimensions not 1, 3, or 4"); \
35       }

/* This before MACRO_END in macros below helps debug...
          fprintf(stderr, "%x in word %d\n", p[offset], offset); \
       */
40
       /* Use this to set a bit in a bit-array. p is the bit array, dimensions
       ** is the number of dimensions, and bitindex is the array of bit indexes,
       ** Here is a prototype:
       ** void cbm_setbit(uint32 *p, int32 dimensions, int32 *bitindex);
45     */
```

```
#define cbm_setbit(p, dimensions, bitindex) \
   MACRO_START \
   BITACCESS_GUTS(bitindex, dimensions) \
   p[offset] |= (1 << *pcol); \
   MACRO_END /* Use this to clear a bit in a bit-array. p is the bit array, dimensions
** is the number of dimensions, and bitindex is the array of bit indexes,
** Here is a prototype:
** void cbm_clearbit(uint32 *p, int32 dimensions, int32 *bitindex);
*/ define cbm_clearbit(p, dimensions, bitindex) \
   MACRO_START \
   BITACCESS_GUTS(bitindex, dimensions) \
   p[offset] &= ~(1 << *pcol); \
   MACRO_END /* Use this to check a bit in a bit-array. Sets result to 0 if the bit is
** clear, 1 if the bit is set. p is the bit array, dimensions is the
** number of dimensions, bitindex is the array of bit indexes, and result
** is what to assign the value to. Here is a prototype:
** void cbm_getbit(uint32 *p, int32 dimensions, int32 *bitindex, int32 result);
*/ define cbm_getbit(p, dimensions, bitindex, result) \
   MACRO_START \
   BITACCESS_GUTS(bitindex, dimensions) \
   *result = ((p[offset] & (1 << *pcol)) != 0); \
   MACRO_END /* The following block of definitions are used to define the size of the
 * interpolation table, the mini-cubes which are the local regions we've seen,
 * and the conversions between them. This is all intended to be used with
 * power of two sizes so shifts and the like can be used, however since
 * it's all here in macros we could do anything arbitrarily silly.
 */

/* Maximum total number of mini-cubes allowed to exist at once. */
#define MAX_TOTAL_CUBES (N_MINI * N_MINI * N_MINI * N_MINI)

#define CLIP_TO_RANGE(_a_, _min_, _max_) \
   (_a_ < (_min_) ? (_min_) : _a_ > (_max_) ? (_max_) : _a_)
```

```
#define OFFSET_AND_SCALE(_a_, _offset_, _scale_) \
    ((_a_ - (_offset_)) * (_scale_))

/* Conversions between mini-cube and index.  Equivalent to:
 * (_a_) / TABLE_SIDE / CUBE_SIDE;
 * (_a_) * (TABLE_SIDE / CUBE_SIDE);
 */
#define I_TO_MINI(_a_) ((_a_) >> 2)
#define MINI_TO_I(_a_) ((_a_) << 2)

/* Conversion from index to offset within mini-cube.  Equivalent to:
 * (_a_) % CUBE_SIDE.
 */
#define MINI_REM(_a_) ((_a_) & 3)

/* Conversion from index to index truncated to mini-cube boundary.
 * (_a_) - ((_a_) % CUBE_SIDE)
 */
#define MINI_TRUNC(_a_) ((_a_) & ~3)

/* Access a 3-d mini-cube from a colortable containing a 3-d table */
#define GET_3MINI(_t_,_a_,_b_,_c_) \
    ((_t_).t3->cubeTable[I_TO_MINI(_a_)][I_TO_MINI(_b_)][I_TO_MINI(_c_)])

/* Access a 4-d mini-cube from a colortable containing a 4-d table */
#define GET_4MINI(_t_,_a_,_b_,_c_,_d_) \
    ((_t_).t4->cubeTable[I_TO_MINI(_a_)][I_TO_MINI(_b_)] \
        [I_TO_MINI(_c_)][I_TO_MINI(_d_)])

/* Access a value within the mini-cube for a 3-d cube */
#define GET_3VALUE(_t_,_a_,_b_,_c_) \
    ((_t_).c3->cube[MINI_REM(_a_)][MINI_REM(_b_)][MINI_REM(_c_)])

/* Access a value within the mini-cube for a 4-d cube */
#define GET_4VALUE(_t_,_a_,_b_,_c_,_d_) \
    ((_t_).c4-
    >cube[MINI_REM(_a_)][MINI_REM(_b_)][MINI_REM(_c_)][MINI_REM(_d
    _)])

/* The following are for generation of pseudo-random noise for use in image
 * data.
 */
#define JITTER_SIZE         1024
#define JITTER_TABLE_SIZE   1024
#define JITTER_MASK         (JITTER_TABLE_SIZE-1)
```

```
#define ERRNOISEOFFSET    ((USERVALUE)((1 << 16) - 1) /
(USERVALUE)TABLE_SIDE)
#define NOISELEVEL        ((USERVALUE)0.25)

/* It seems most of the brain-dead "C" implementations around here don't
 * define the standard c-math library function "rint". So, we cover that
 * omission here with a macro. If you're lucky enough to have a proper
 * ANSI C environment, just define this to be your local rint which will
 * likely be much faster!
 */
#define UVAL_RINT(_t_) (USERVALUE)((USERVALUE)(_t_) >
(USERVALUE)0.0 ? \
                (USERVALUE)(_t_) + (USERVALUE)0.5 : \
                (USERVALUE)(_t_) - (USERVALUE)0.5);

/* jitter macros */
#define JITTERX(uranx,irand,x,y,s) \

(uranx[((x+(y<<2))+irand[(x+s)&JITTER_MASK])&JITTER_MASK])
```

From the above description, it will be apparent that the invention disclosed herein provides a novel and advantageous image processing system and method using interpolation, noise addition, and truncation. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

From the above description, it will be apparent that the invention disclosed herein provides a novel and advantageous image processing system and method using interpolation, noise addition, and truncation. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system for processing images, based on using a cube with a plurality of sub-cube portions to transform source color image values to target color image values, the system comprising:

an image file subsystem providing at least one source color image value represent a source color comprising;

a color transformation subsystem operatively coupled to the image file subsystem and accepting as input the at least one source color image value and producing at least one target color image value therefrom; and an image forming subsystem operatively coupled to the color transformation subsystem and forming a physical manifestation of the source color image from the produced at least one target color image value, the color transformation subsystem being configured to define a memory area for at least one sub-cube portion as representative of the at least one source color image value;

determine target color values corresponding to the defined sub-cube portion to populate the memory area;

determine the at least one target color image value in response to the determined target color valurs; and determine the at least one target color image value in a first manner in response to an accuracy of interpolation exceeding a predetermined threshold and to determine the at least one target color image value in a second manner in response to the accuracy of interpolation not exceeding a predetermined threshold;

such that the at least one target color image value can be determined without the need of determining all of the target color values corresponding to all of the sub-cube portions.

2. A method of processing a source color image with at least one source color image value to produce a target color image with at least one target color image value, based on using a cube with a plurality of sub-cube portions to transform source color image values to target color image values, the method comprising the steps of:

defining a memory area for at least one sub-cube portion as representative of the at least one source color image value;

determining target color values corresponding to the defined sub-cube portion to populate the memory area;

determining the at least one target color image value in response to the determined target color values; and determining the at least one target color image value in a first manner in response to an accuracy of interpolation exceeding a predetermined threshold and to determine the at least one target color image value in a second manner in response to the accuracy of interpolation not exceeding a predetermined threshold;

such that the at least one target color image value can be determined without the need of determining all of the target color values corresponding to all of the sub-cube portions.

* * * * *

UNITED STATES PATENT AND TRADEMARK OFFICE
CERTIFICATE OF CORRECTION

PATENT NO. : 5,862,253
DATED : January 19, 1999
INVENTOR(S) : Schuneman et al.

It is certified that error appears in the above-identified patent and that said Letters Patent is hereby corrected as shown below:

IN THE CLAIMS

Col. 83, line 19: after "value" and before "a" delete "represent" and substitute --representing--.

Col. 83, line 19: after "color", delete "comprising" and substitute --image--.

Signed and Sealed this

Tenth Day of August, 1999

Attest:

Attesting Officer

Q. TODD DICKINSON

Acting Commissioner of Patents and Trademarks